United States Patent [19]

Corman

[11] 4,107,523

[45] Aug. 15, 1978

[54] EQUIPMENT FOR AUTOMATICALLY MONITORING THE VERTICALITY OF BOTTLES

[75] Inventor: Guy Corman, Lyon, France

[73] Assignee: Boussois Souchon Neuvesel Gervais Danone (Societe Anonyme), Levallois-Perret, France

[21] Appl. No.: 762,172

[22] Filed: Jan. 24, 1977

[30] Foreign Application Priority Data

Jan. 26, 1976 [FR] France .................................. 76 02486

[51] Int. Cl.² ............................................ G01D 21/04
[52] U.S. Cl. ................................................ 250/223 B
[58] Field of Search ........... 250/222 R, 223 R, 223 B; 356/240, 162, 163, 165, 205

[56] References Cited

U.S. PATENT DOCUMENTS

| | | | |
|---|---|---|---|
| 3,089,594 | 5/1963 | Early | 250/223 B |
| 3,436,555 | 4/1969 | Foster | 250/223 B |

*Primary Examiner*—James B. Mullins
*Attorney, Agent, or Firm*—Karl F. Ross

[57] ABSTRACT

An apparatus for detecting nonverticality of small-mouthed bottles comprises means for training a light beam across a conveyor path and, in the region of this light beam further means for directing a light beam downwardly on to the path and into the mouth of the bottle. A detector responds to reflective light from the lip or rim of the mouth so that the offset of the center of the mouth and the base of the bottle can be detected.

11 Claims, 11 Drawing Figures

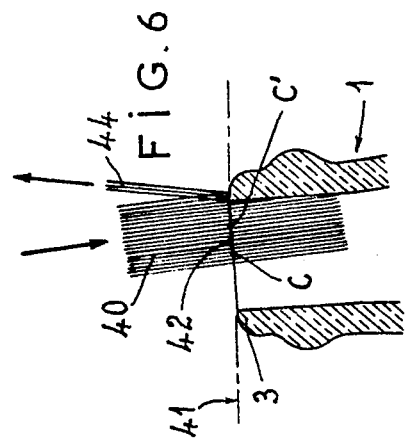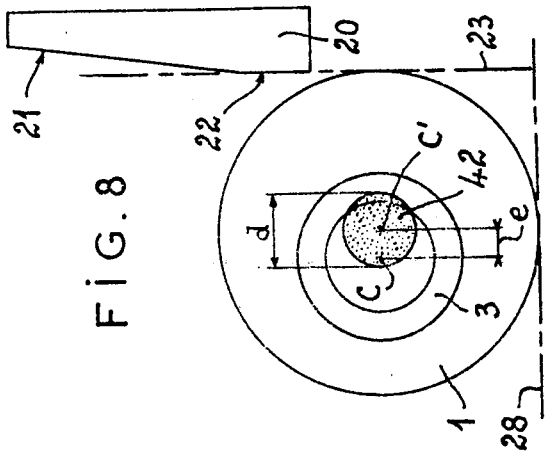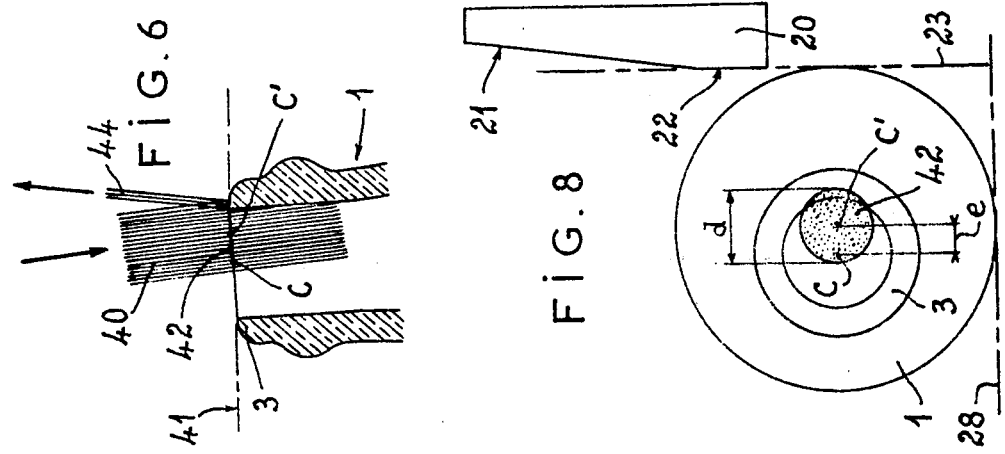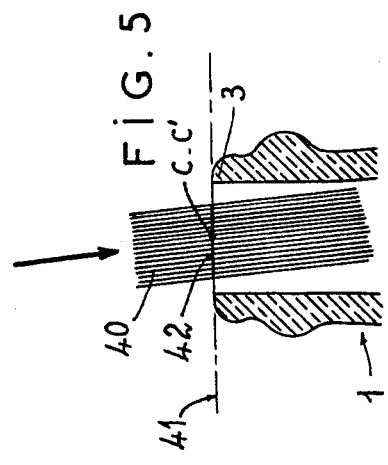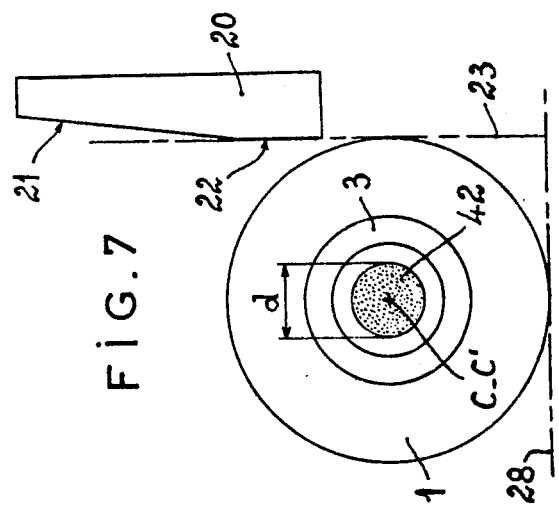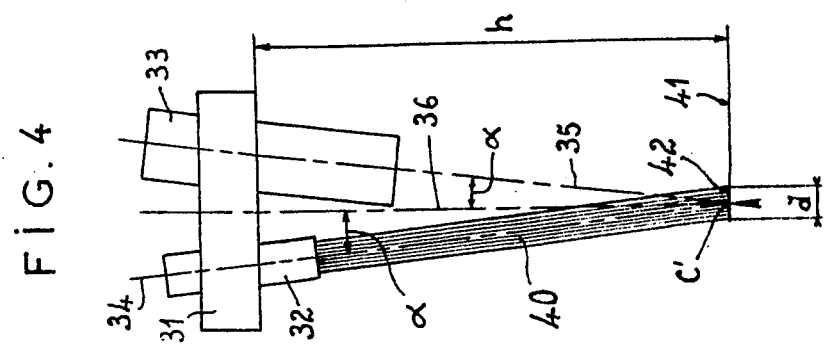

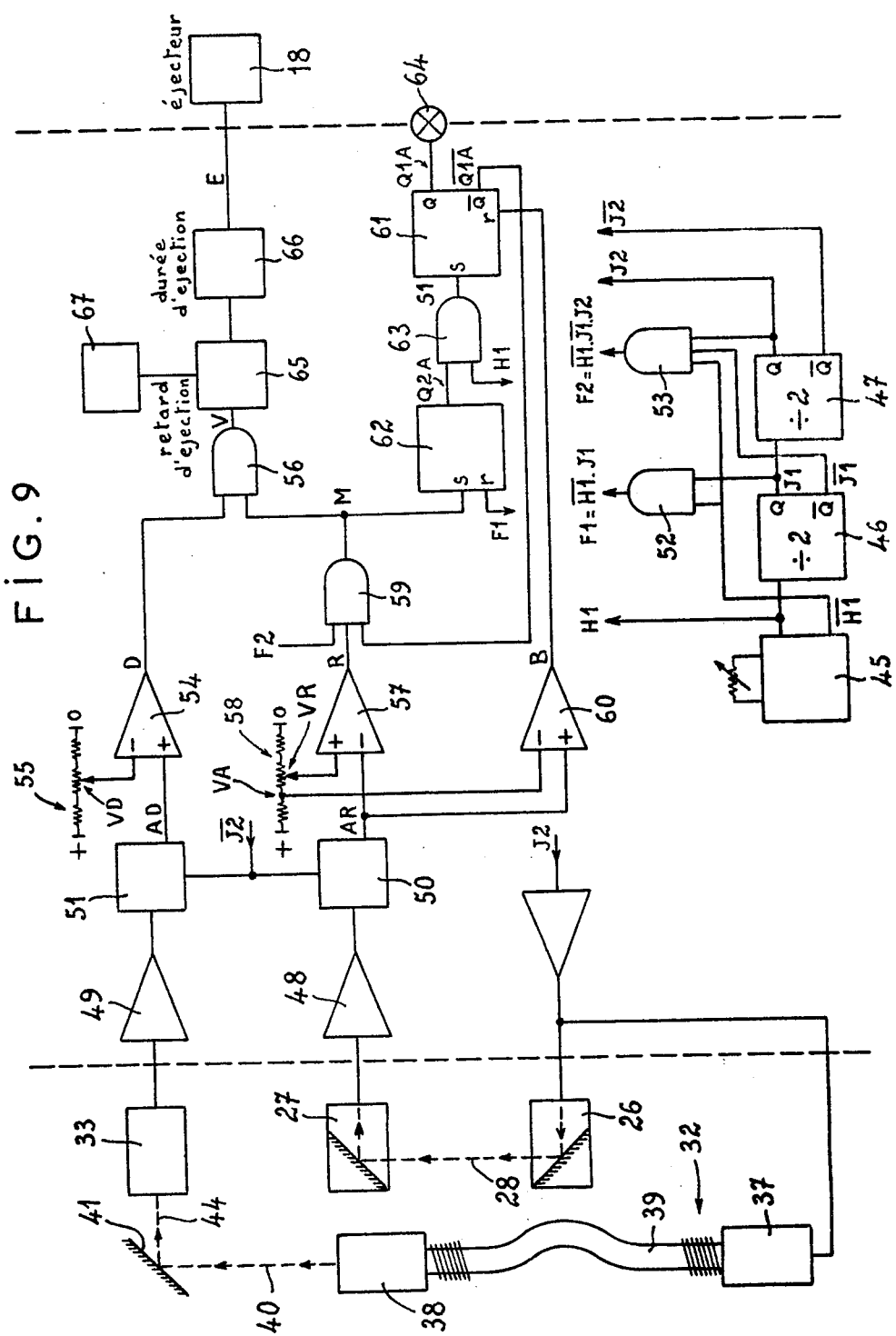

EQUIPMENT FOR AUTOMATICALLY MONITORING THE VERTICALITY OF BOTTLES

This invention relates to a device for automatically monitoring the verticality of bottles, and more particularly cylindrical bottles with a small mouth.

The defects of verticality of bottles involve increasing difficulty for glass makers and their customers. On the one hand, the increases in bottle manufacturing rates oblige glassmakers to cool the articles outside the finishing molds, the effect of which is to increase the deformations on these articles in the event of a maladjustment of the corresponding ventilation systems. In addition, the packing machines of customers allow less and less any differences in dimensions outside the tolerances, and these tolerances tend to become tighter and tighter.

Dimensional defects other than differences in verticality may be detected easily by wellknown selecting devices.

BRIEF DESCRIPTION OF THE DRAWING

FIG. 4 is a partial elevational view showing a projector and detector forming part of the detecting device of the principal invention;

FIGS. 5 and 6 are sections through the neck of a bottle showing the relative positions of the beam and the lip of the bottle mouth for a bottle free from the verticality defect and for a bottle having such a verticality defect;

FIGS. 7 and 8 are plan views of bottles subjected to monitoring and corresponding to FIGS. 5 and 6 respectively;

FIG. 9 is a block diagram of a circuit for controlling the apparatus of FIG. 3;

The same does not apply to verticality defects. FIG. 1 of the attached drawing shows a cylindrical bottle 1 placed on a horizontal plane 2. If O designates the projection on this plane of center C of lip 3 of the bottle and O' the center of the circular base of the body of the bottle, the difference in verticality $e$ may be defined by the distance OC'.

There are already manual monitoring devices wich make it possible to detect the double difference 2 × OO'.

The verticality tolerance, expressing the limiting value of the difference $e$ related to the height H of the bottle, is usually 1%, 2% if one uses the convention which consists of considering the double difference 2$e$.

The difference in verticality defined in this way is in practice difficult to measure absolutely precisely. In fact, although the center C of lip 3 is relatively well defined, the same is not the case as regards the center O' of the base of the bottom, by virtue of the ovalization or frequent flats in this zone. In addition the flat bottom of the bottle is often warped and, in this case, the slightest force exercised on the base of the body during monitoring involves a considerable difference in the position of lip 3 and consequently point O.

For automatic monitoring of the verticality difference to be possible, it is therefore necessary that in the bottle-measuring position, the surface where the bottle is to stand must be flat, and that no position stress must be exercised on the article. These two conditions mean in practice that the device monitors articles with a space between them, as they pass on a flat conveyor which takes the place of the standing surface, using optical processes, and the equipment has to detect any defect whatever the direction along which it occurs in relation to the center line of the said conveyor.

Figure 1:
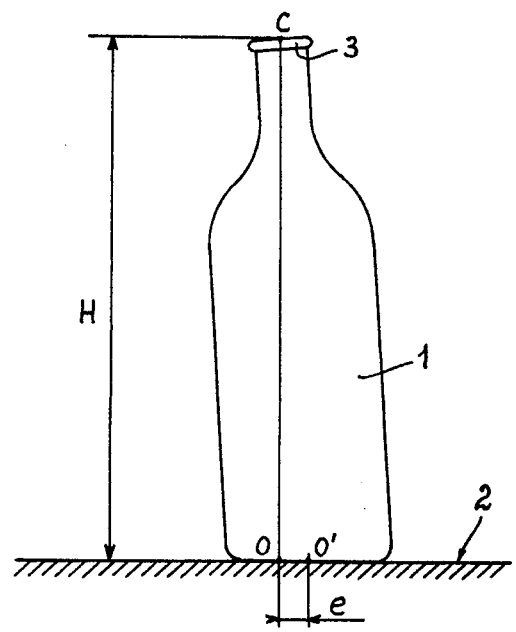
FIG. 1 is a diagram corresponding to an elevational view of a bottle illustrating the principal involved in detection of verticality.
Figure 2:
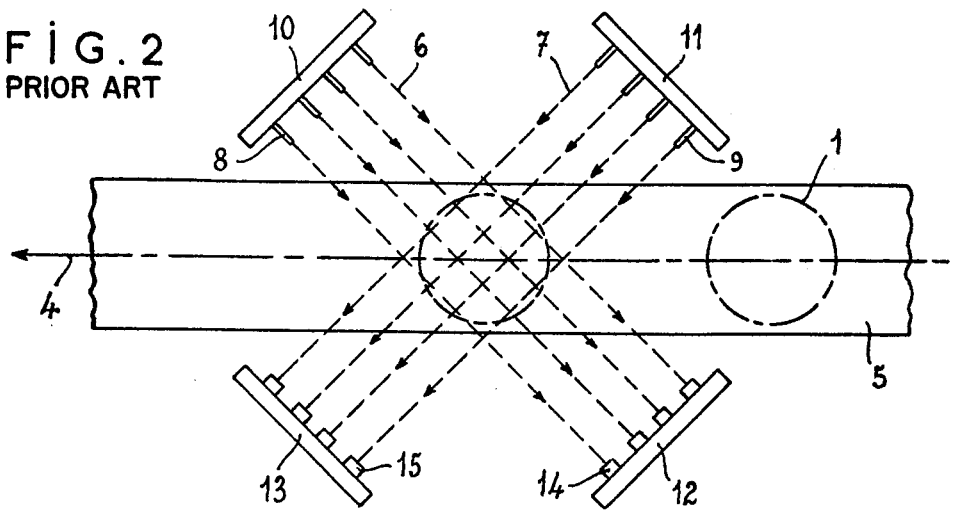
FIG. 2 is a plan view of a prior art device using light beams directed from opposite sides of the path of the bottles.

An automatic monitoring device meeting the conditions stated above has been built and marketed, and its principle is demonstrated in FIG. 2 which is a diagram of the system, viewed from above.

The bottles are driven in the direction of arrow 4 by a conveyor 5 with rectified plates, forming part of the device, and are sorted by a screw. They pass through two series of light beams 6 and 7 called "right" and "left", the center lines of which are arranged at 45° in relation to the center line of conveyor 5, and at 90° in relation to each other. These beams are emitted by projectors 8 and 9 respectively fixed on pattern plates 10 and 11, fitted in precise positions. Similar plates 12 and 13 hold receivers 14 and 15, arranged so as to receive the fine pencil beams emitted by the corresponding projectors. Each "left" and "right" assembly uses four projectors and four receivers, two of the beams being located over the pattern plates and two below, with a symmetric arrangement in relation to the vertical median plane of the said plates.

The two top beams have a spacing slightly less than the diameter of the neck of bottles 1 which are to be monitored, whilst the two bottom beams have a spacing equal to the diameter of the body reduced by a certain value, so that the cycle of blackout resulting from the passage of a bottle on conveyor 5 is as follows, if for example "right-hand" beams 6 are considered:

The simultaneous interruption of the two bottom beams, taking the form of an initial pulse from a logic circuit 1, is longer than the simultaneous interruption of the two top beams, which takes the form of a second pulse from the logic circuit 1. The decentering of this second pulse in relation to the first is a function of the difference in verticality of the bottle in the plane perpendicular to the direction of the "right-hand" beams considered. This decentering is measured in accordance with a wellknown technique by counting and discounting clock pulses provided by an incremental coder driven by the conveyor. The same operation is carried out simultaneously with the "left-hand" beams 7 and the actual verticality difference of the bottle is calculated by the application of the Pythagoras theorem.

Although the verticality monitoring effected by this existing device is precise and reliable, the device itself is complex, bulky and expensive:

In the first place, the position of the projectors and receivers depends on the dimensions of the articles to be monitored so that it is necessary to provide a set of four special pattern plates for each article. In addition, the over-all dimensions of the device, of around 3 meters, are far too large to allow its inclusion on an existing selection line and finally the cost of purchasing it is excessive taking in to account its fittings and in particular the sets of pattern plates.

This invention therefore, provides a device for the automatic monitoring of verticality of bottles which is small in size along the conveyor, so that it can be set up easily on an existing line which may be adapted rapidly to the dimensions of the articles to be monitored, and the actual cost price of which, bearing in mind the related fittings, is low.

For this purpose, the device in accordance with this invention of the type where the bottles, previously sorted, are monitored by means of optical processes as they pass by on a flat conveyor, consists in combination, of: a device for aligning the bottles by the base of their body along a center line parallel to that of the conveyor; a first photo-electric device called the "locating" device, designed to issue an intial special signal when the base of the body of a bottle, suitably positioned by the afore-mentioned alignment device, reaches an optical beam perpendicular to the center line of the conveyor; a second photo-electric device called the "detecting" device designed to emit an optical beam orientated downwards, focused on a circular "spot" at the level of the top plane of the lip of the bottles and having a diameter less than the inside diameter of the annular flat part of the said lip; a device designed to issue a second special signal when a verticality defect on the bottle causes a reflection of the afore-mentioned optical beam on the annular flat part of its lip; facilities designed to take into account this second signal only at the time when the bottle reaches the first optical beam; and an ejector designed to eliminate defective articles, the operation of which shall is monitored by the afore-mentioned facilities.

The "alignment" center line and the "locating" beam emitted by the first photo-electric device, perpendicular to each other, are therefore at a tangent to the bottom part of the cylindrical body of the bottle at the time when it is monitored. If the bottle during monitoring is vertical, the "detecting" beam emitted by the second photo-electric device is lost inside the article, passing through its opening. If the bottle during monitoring has however a verticality defect such that the afore-mentioned beam reaches any sector on the top annular surface of the lip, then this causes a partial reflection of the beam which reaches the photo-electric detector of the detecting device. Regulating the diameter of the beam, it is easy to adjust the required tolerance.

This principle makes it possible to produce a monitoring device which is simple from the optical point of view, since it uses only two beams, which is not very expensive, and is easy to regulate and is capable of detecting the verticality defects with adequate precision whatever their orientation in relation to the conveyor. Thanks to its small size, this device may be fitted on an existing line, for example downstream of another monitoring machine, which makes it possible to save on a special bottle sorting device.

In accordance with an embodiment of this invention, the alignment device consists of a deflector made of a material with a low coefficient of friction, having an edge forming an angle with the centre line of the conveyor, extended by a part parallel to this centre line, defining the bottle alignment centre line, the said deflector being supported by a vertical column attached to one of the sides of the conveyor, with the possibility of adjusting its position along 3 lines which are perpendicular in pairs.

This vertical column, hereinafter called the support column, may also be used to hold the mechanical parts of the locating and detecting devices.

In fact, the locating device should include a projector and photo-electric detector carried by an arch integral with a fitted slide, with the possibility of adjustment of its vertical position on the afore-mentioned support column.

In accordance with another feature the detecting device includes the projector and a photo-electric detector carried by a support plate connected to a fitted slide, with the possibility of adjusting its vertical position on the afore-mentioned support column, the respective centre lines of the projector and detector, located on one and the same vertical plane perpendicular to the center line of the conveyor, being symmetrical in relation to a vertical center line contained in this plane, facilities being provided for adjusting the position of the support plate along two horizontal perpendicular lines, so that the afore-mentioned vertical line is merged with the center line of a bottle without verticality defect when this reaches the optical beam emitted by the locating device. The symmetry of the projector and detector center lines ensures reflection of the optical beam striking in the direction of the said detector, when the "spot" reaches the horizontal annular part of the lip.

A great many adjustment possibilities mentioned above make it possible to adapt the equipment easily to bottles of very different diameters and heights.

Preferably, the projector of the detection device should include a source of radiation connected to its optical part through an optical fiber. In this way, it is possible to feed the projector with white light for the preliminary adjustment of the device, and with infra-red radiation in normal operation.

In a preferred embodiment, the source of radiation of the locating device, and of the detecting device, is formed in normal operation by infra-red sources, the radiation of which is modulated; the infra-red radiation makes it possible to obtain the optimum performance of the semi-conductor detectors, and modulation prevents the influence of parasitic sources of radiation.

The device according to the invention also has a large electronic section, ensuring modulation of the demodulation and processing of the electrical signals delivered by the locating and detecting devices.

Thus in a special embodiment, the facilities designed only to take into account the signal from the detecting device at the moment when the bottle reaches the optical beam emitted by the locating device includes an initial comparator designed to compare the afore-mentioned signal with an initial voltage level displayed, a second comparator designed to compare the signal emitted by the locating device with a second voltage level displayed, a third comparator designed to compare the foregoing signal with a third voltage level different from the last level displayed, and logic circuits connecting the outputs of the aforementioned comparators to an ejector control circuit, these circuits being arranged so as to enable control of the ejector from the output signals from the first two comparators, but to prevent any new action during the time interval when the output signal of the third comparator preserves the value picked up the moment the bottle which is being monitored reaches the optical beam emitted by the locating device. This prevention function is essential for the locating device by itself authorizes monitoring from a certain position of advancement of the bottle but is not capable of preventing the repetition of this monitoring; without special provisions, the result of this would be systematic errors since the bottle, continuing to advance beyond the monitoring position, would systematically cause a reflection of the optical "detecting" beam not resulting from a verticality defect.

In accordance with an embodiment of the afore-mentioned logic circuits, these include: an initial gate ET with two inputs, one of which is connected to the output of the first comparator, and the output of which is connected to the ejector control circuit; the second gate ET with three inputs, one of which is connected to a synchronizing and modulation circuit issuing periodic pulses, another input of which is connected to the output of the second comparator, and the output of which is connected to the second input of the first ET gate; and a logic circuit called "autorization and measurement blocking" circuit, controlled from the output signal of the third comparator, and from certain periodic pulses received from the afore-mentioned synchronizing and modulation circuit, and issuing a logic signal transmitted to the third input of the second ET gate. Thus, the "measurement" is authorized or enabled by the second ET gate, in synchronization with the periodic pulses connected to the modulation of the infra-red radiations, only if the locating device transmits a special signal and if the authorization and measurement blocking logic circuit also issues a signal, this circuit being designed so as to allow only one measurement as each bottle passes, and this at the required moment; the first ET gate, "opened" by the second, may then transmit to the ejector control circuit the special signal from the detecting device, if there is a reflection of the optical beam transmitted by this device.

The ejector control circuit should, as an advantage, include a displacement record, designed to record and delay for a certain amount of time an ejection order from the afore-mentioned logic circuits, and a circuit designed to control the action of the ejector for a pre-set period, the displacement recorder shall be set so that the ejector is operated at the precise moment when the defective article located passes before it.

Figure 3:
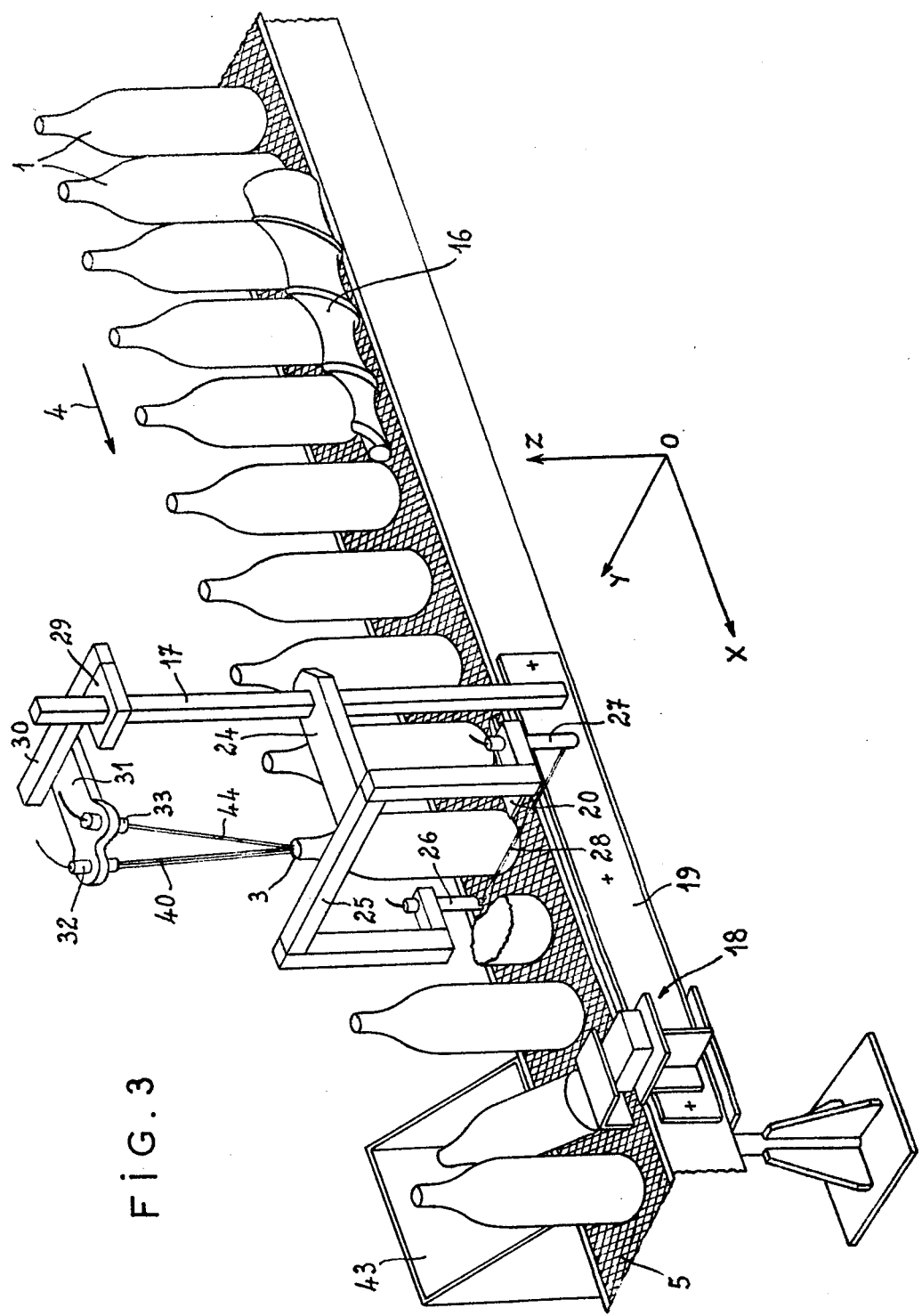
FIG. 3 is a perspective view diagrammatically illustrating an apparatus operating in accordance with the principls of the present invention.

As shown by FIG. 3, the mechanical part of the device embodying this invention includes essentially a horizontal flat conveyor 5, designed to be driven in the direction of arrow 4, on the path of which the following items are placed successively in the forward direction of movement of bottles 1:

a bottle-sorting device 16;
 a support column 17 on which are fitted the alignment, locating and detecting devices; and
 an ejector 18 which eliminates the defective bottles.

To facilitate the more detailed description which follows, reference will be made to a system of three co-ordinates OX, OY, OZ, in which: line OX is parallel to the displacement of conveyor 5 and in the same direction as arrow 4, line OY is horizontal and normal to the displacement of the conveyor, and line OZ is vertical and oriented upwards.

The bottle-sorting device 16 may consist of any well known mechanism making it possible to separate the bottles and align them roughly, this mechanism being made in accordance with the example shown in the form of a rotating screw, turning around a largely horizontal line. Instead of providing a special sorting device, it is also possible to take advantage of the separation brought about at the outlet from another monitoring device located upstream on the same conveyor.

Downstream of sorting device 16, a side plate 19, attached to one of the sides of the conveyor 5, supports column 17 which is vertical and has a square horizontal section, the sides of this section being parallel respectively to lines OX and OY. Column 17 supports three devices which are adjustable as regards position:

The first of these devices is the alignment device already mentioned and this consists basically of a deflector 20 made of plastic with a low coefficient of friction, the profile of which can be seen well in FIGS. 7 and 8. Deflector 20 has, on its side turned to the center of conveyor 5, and on its upstream part, an edge 21 forming a slight angle with the direction of line OX which extends downstream by a part 22 parallel to line OX. This part defines a line 23 called the "line of alignment".

The support of the deflector 20, not shown in FIG. 3 in order to keep the drawing clear, ensures its attachment to columns 17 and makes it possible to regulate the position of the said deflector by separate movements, along the directions of the three lines OX, OY, OZ. The vertical position of deflector 20 must be such that it aligns all the bottles 1 along the line 23, by the base of their body, acting at a height taking into account the profile of the articles and any inscriptions in relief that they might have.

The second moving device is what is called the locating device. It has a slide 24 fitted on column 17, therefore adjustable in position along the vertical direction OZ, which carries a rigid arch 25 oriented transversally in relation to conveyor 5. At the two bottom ends of arch 25 a projector 26 and a detector 27 are fitted, both having their center lines parallel to lines OZ.

By means of prisms producing the equivalent of mirrors at 45°, an optical beam 28 called the locating beam is obtained from projector 26, formed by rays parallel to line OY, which are focused in detector 27 on a photoelectric cell. The source of radiation of projector 26 should preferably be an infra-red transmitting diode.

The vertical position of the line of rotating beam 28 is normally regulated, by adjusting the position of slide 24 on support column 17 to the same height as deflector 20. In addition the position of deflector 20 along line OX must be such that its part 22 is no longer in contact with the bottle 1 at the time this reaches the locating beam 28, so as not to impose a preferential position on a bottle, the bottom of which might be warped.

The third moving device, which is what is called the detecting device, is connected to support column 17, through another slide 29, vertical in position and adjustable on the said column. Slide 29 carries a crosspiece 30 which goes over conveyor 5, to which is attached a horizontal support plate 31 which carries a projector 32 and a detector 33. Mechanical facilities not shown but which are well known in themselves are provided for adjusting with precision and without play the position of support plate 31 along the two orthogonal directions of horizontal lines OX and OY.

FIG. 4 shows support plate 31 in greater detail and projector 32 and detector 33, which are held rigidly so that their respective lines 34 and 35 are contained in a vertical plane parallel to plane ZOY, that is to say perpendicular to line OX. The two lines 34 and 35 are symmetrical in relation to vertical lines 36 passing through their point of intersection C', and they form with this vertical line two angles which are equal and slight. The vertical distance between point C' and the bottom face of support plate 31 is fixed and designatyed by h.

Projector 32 should include a source of radiation 37 which transmits its signal to optical part 38 through an optical fiber 39 which will have a perfectly circular cross-section, as shown very much in the form of a diagram by the left-hand side of FIG. 9. In this way it is possible to feed a projector 32 with white light to regulator device, and with infra-red radiation for monitoring the verticallity of bottles 1, without changing its focus, the source of radiation of projector 32 in normal operation being an infra-red source similar to that of projector 26. Optical beam 40 transmitted by projector 32 forms, on a horizontal plate 41 passing through point C' a circular "spot" 42 cenetered in that point, the diameter of which is designated by d.

Detector 33 focuses on its photo-electric cell any reflection produced by a horizontal surface merged with a part of "spot" 42.

The position of the detecting device previously described is regulated vertically, so that the bottom face of support plate 31 is located exactly at height h, previously defined, above the top plane of lip 3 of a bottle 1, placed on conveyor 5, or, which comes back to the same thing, so that horizontal plane 41 is merged with the top plane of lip 3. In addition, the position of the detecting device is adjusted, along the direction of horizontal lines OX and OY so that vertical line 36 is merged with the center line of a bottle 1 which is perfectly vertical in the series to be monitored, the value of which should be at a tangent to the line of alignment 23 and locating beam 28. In other words, these two settings mean bringing into coincidence the center C' of "spot" 42 with center C of lip 3 on a bottle having no verticality defect (case of FIGS. 5 and 7).

Moreover, diameter d of the said "spot" will be adjusted to a value less than the inside diameter of the annular horizontal part of lip 3 of the bottles to be monitored. In application of the laws of geometrical optics, FIG. 4 shows that it is possible to vary the diameter d by shifting projector 32 in relation to support plate 31 along line 34 and by focusing again at C' the image of the tip of optical fiber 39. Detector 33 is then focused so that the image which it may receive by reflection of "spot" 42, forming the object, is completely contained in its photo-electric cell. These adjustments are effected by means of a source of visual white light, which is then replaced by the source of infra-red radiation.

Finally ejector 18 is fitted on the same side plate 19 as support column 17 at a fixed distance downstream of this column. The ejection component consists of a push rod which rejects the defective articles into a channel 43 located on the other side of conveyor 5.

The principle of operation of the device, as regards its mechanical and optical part, is illustrated by FIG. 5 to 8.

Sorting device 16 and deflector 20 bring the bottles 1, separated from each other and strictly aligned by the base of their body along line 23, to the level of locating beam 28, which defines the monitoring position (FIGS. 7 and 8).

If bottle 1 arriving in a position tangential to locating beam 28 is strictly vertical, or has a verticality defect which is very slight, so that "spot" 42 does not merge with any part of the annular horizontal part of lip 3, detecting beam 40 is not reflected on plane 41 and disappears inside bottle 1, passing through its opening. Detector 33 detects no reflected ray and the article may be considered as having no verticality defect (case of FIGS. 5 and 7).

Where bottle 1 on the contrary has a verticallity defect which is not negligible, spot 42 is made eccentric in relation to lip 3 and reaches a certain sector of its annular horizontal part, which causes a partial reflection of detecting beam 40. Reflected beam 44 reaches detector 33 on the detecting device, which then issues a special signal which constitutes the order to eliminate the defective article. This order is transmitted to ejector 18 with suitable synchronisation in relation to the progress of conveyor 5, so that the ejector is operated at the moment the article concerned passes before it (case of FIGS. 6 and 8).

By regulating the diameter d of the "spot" it is easy to adjust the required tolerance, that is to say the minimum verticallity defect e for which a bottle is rejected.

Although FIG. 8 may give the idea that the verticality defect is manifested on a plane parallel to locating beam 28, it must be understood that this is only a special case taken as an example and that the principle of operation previously discussed makes it possible to detect a defect of verticallity whatever its orientation in relation to the direction of line OX or OY.

The two projectors 26 and 32 and the two detectors 27 and 33 are connected to electronic circuits shown in the form of a diagram in FIG. 9.

These circuits have a "synchronizing and modulating" section, visible at the bottom of FIG. 9 and controlled by a high frequency clock 45, making it possible to effect sequences in "real time" that is to say with periods of duration corresponding to a negligible displacement of a bottle 1 at the maximum speed of conveyor 5.

The frequency of output signal H1 of clock 45 is divided by two in an initial divider 46 issuing a periodic signal J1; this last signal is itself divided by two in a second divider 47 which therefore issues a periodic signal J2 of a frequency equal to a quarter of that of clock 45. The crenellated shapes of signals H1, J1 and J2 are shown at the top of the diagram in FIG. 10.

Signal J2 modulates the radiation from the infra-red transmitters of locating projector 26 and detecting projector 32, and demodulates the signals from corresponding detectors 27 and 33, these signals first being amplified at 48 and 49 then filtered at 50 and 51 respectively. The modulation and demodulation process used, well known in itself, makes it possible to eliminate the signals which might come from parasitic sources of radiation, while the infra-red radiation makes it possible to obtain maximum performance from the optoelectric silicon detector.

Figure 10:
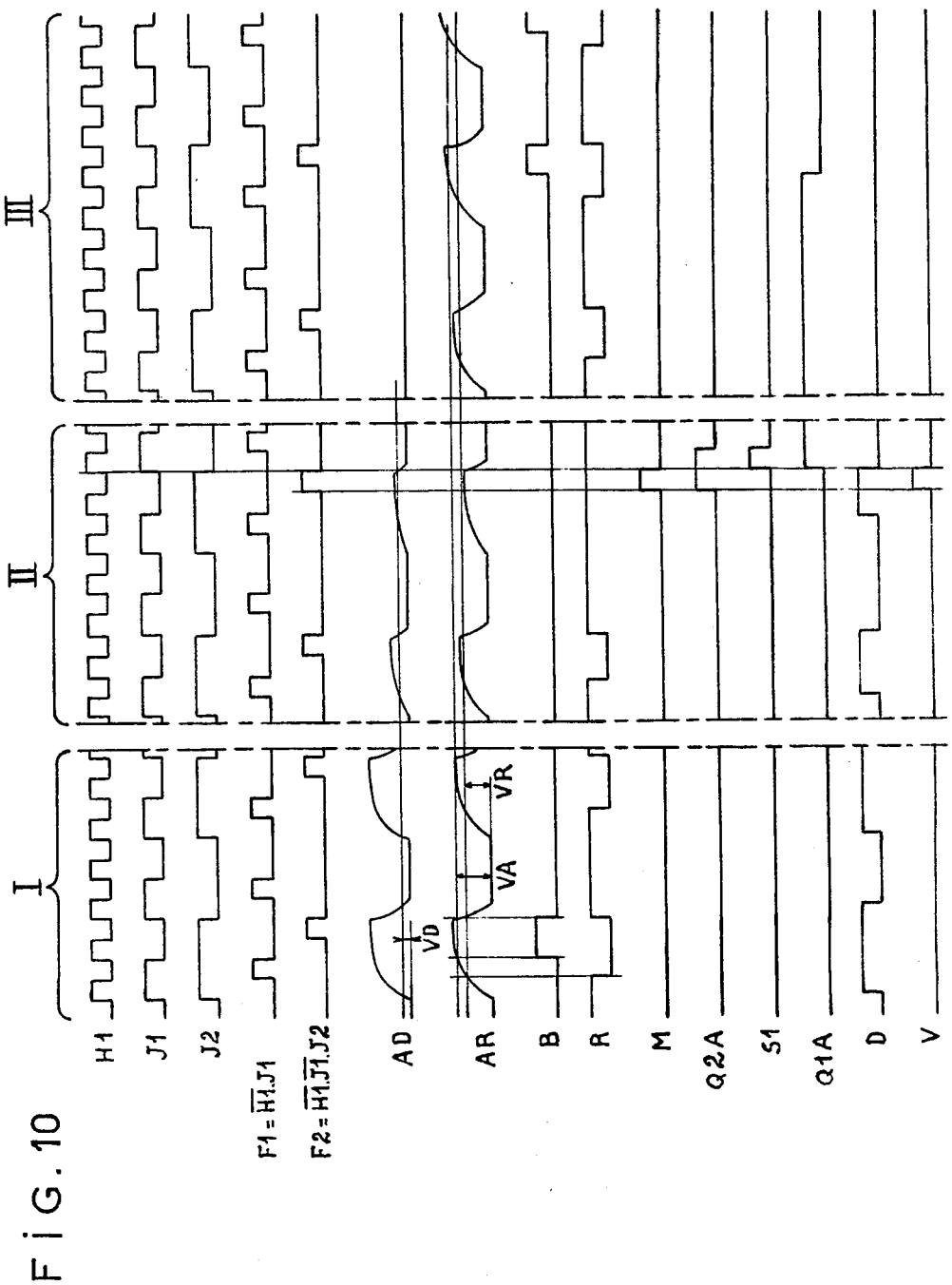
FIG. 10 is a pulse diagram showing the timing and sequences of the pulses in the various portions of the circuit of FIG. 9.

The first gate ET 52 with two inlets combines signals H1 and J1 to give a signal F1 defined by the logic multiplication, F1 = H1.J1. A second gate ET 53 with three inputs combines signals H1, J1 and J2 to give a signal F2 defined by the logic multiplication F2 = H1.J1.J2. The shapes of periodic signals F1 and F2 are indicated in FIG. 10 which also shows their phase displacement.

Filtering and demodulation stage 51 connected to detecting detector 33 transmits a noted signal AD injected into one of the inputs of a first comparator 54, which compares it with a positive voltage level VD displayed by a first potentiometer 55. Comparator 54 in this way transmits to a gate ET 56 on its two inputs, a logic level D equal to 1 if the signal AD is greater than the reference level VD.

Likewise, filtering and demodulation stage 50 connected to locating detector 27 transmits a noted signal AR injected into one of the inputs of the second comparator 57, which compares it with a positive voltage level VR displayed by a second potentiometer 58. Comparator 57 in this way transmits to another gate ET 59 having three inputs a logic level R equal to 1 if the signal AR is less than the reference level VR.

Again a third comparator 60 is provided, one input of which receives the AR signal already mentioned, and the other input of which is taken to a constant voltage level VA, which is not adjustable, but is systematically higher than lever VR. Comparator 60 transmits in this way to input "r" of a bistable scale 61, of the "RS" type, a logic level B equal to 1 if the AR signal is higher than the reference level VA.

Bistable scale 61 forms part of a logic circuit called the "authorization and measurement blocking" circuit which comprises: gate ET 59 already mentioned, a first input of which receives the periodic signal F2 transmitted by gate ET 53, a second input of which receives logic level R from comparator 57 and a third input of which is connected to the "Q" output of bistable scale 61; a bistable scale 62, of the "RS" type, the tripping input "s" of which receives logic level M transmitted by gate ET 59 and the "r" input of which receives signal F1 transmitted by gate ET 52; another gate ET 53 one input of which receives logic level Q2A corresponding to the state of scale 62 and the other input of which receives periodic signal H1 generates by clock 45, the said gate ET 62 transmitting an output signal S1 which is taken to the "s" input of scale 61. The output "Q" of scale 61, where a logic signal Q1A appears, is connected to a warning light 64, whilst its "Q" output is connected to gate ET 59, as indicated above.

Finally, the circuits comprise a control circuit for ejector 18, consisting of gate ET 56 already mentioned, a displacement recorder 65 and a "monostable" circuit 66 connected to ejector 18. Gate ET 56 has an initial input receiving logic level D transmitted by comparator 54 and a second input receiving logic level M transmitted by gate ET 59. Output signal V of gate ET 56 is called the "defect signal", having regard for its role which will appear in the description of the monitoring cycle below.

Figure 11:
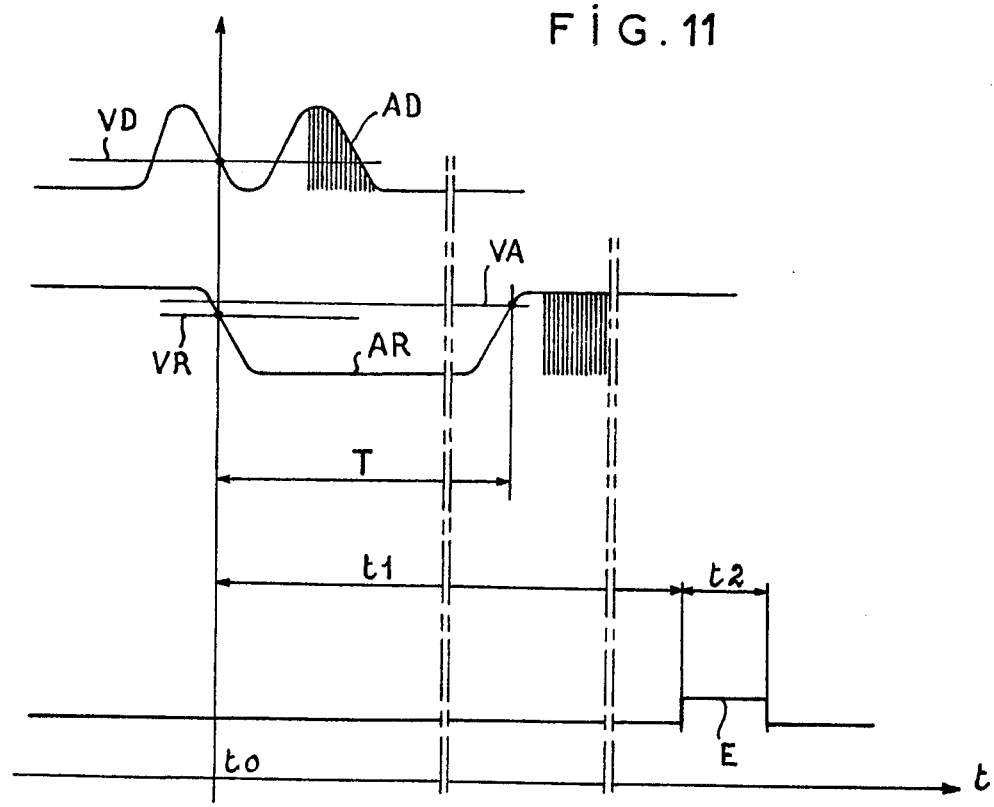
FIG. 11 is a pulse diagram compressed in time and illustrating other aspects of the operation of the circuit.

The various stages of the monitoring cycle, during the passage of a bottle 1 driven by conveyor 5, are shown in FIG. 10 showing the detailed shape of the various electric signals defined above, and in FIG. 11 where certain of the signals are shown in a form "compressed in time", so as to give an overall view of the cycle.

Before monitoring, the photoelectric cell of locating detector 27 receives the maximum modulated light. The signals 40 received, amplified at 48 then filtered and demodulated at 50, have a high voltage level at the end of each pulse of signal AR, as shown on the left-hand side of FIG. 10 corresponding to the first phase reference marked I. This voltage level is in particular highered and level VR displayed by potentiometer 58, so that comparator 57 transmits a logic level R equal to 0 at the moment an F2 signal pulse occurs at the input of gate ET 59.

Gate ET 59 therefore remains "closed", logic level M at its output is equal to 0, and in consequence the same applies as regards gate ET 56 of the ejector control circuit, which prevents any effect from the signals from setecting detector 33.

During this phase, the AR signal pulses reach a voltage level higher than level VA and comparator 60 therefore transmits pulses (signal V) which are taken to the "r" input of scale 61 and all tend to wipe out any content in the latter, that is to say to keep its "Q" output at level 0 and its "Q" output at level 1.

From a certain moment, bottle 1 penetrates into locating beam 28 and causes a reduction in the amplitude of signal AR. When this drop is such that the peak voltage of the pulses is less than level VA, comparator 60 ceases to issue signal B to bistable scale 61, but the latter does not change its state.

The amplitude of signal AR continuing to drop, as a result of the increasing screening of the photoelectric cell of locating detector 27, there occurs a first pulse of this signal no longer reaching reference level VR during which comparator 57 therefore issues a logic level R remaining equal to 1 (see the center part of FIG. 10, reference marked II). During the corresponding pulse period of signal lamps 2, gate ET 59 receives a level equal to 1 at each of its three inputs; it is then "open", logic level M being equal to 1, and produces two effects; on the one hand, it cancels out blocking of gate ET 56 and "authorizes" measurement; in addition, it supplies pulses to the circuit which includes bistable scales 61 and 62 and gate ET 63, to obtain a measurement "blocking" effect then prevention of a new measurement, which will be explained further on.

At the same time, signal AD supplied by the amplitude and demodulation circuit following detecting detector 33, occurring in the form of pulses synchronised with those of signal AR (locating), produces a logic level D equal to 1 if it exceeds level VD displayed by potentiometer 55; this occurs effectively if and only if bottle 1 has a verticality defect such that its lip 3 reflects detecting beam 40 in the direction of detector 33.

The simultaneous presence of a logic level 1 at the two inputs of gate ET 56, at the time of measurement authorization transmitted by gate ET 59, causes at its output a pulse V shown at the bottom of FIG. 10, which is transmitted to a displacement recorder 65. It should be noted that the "ejection" circuit is only used at the end of each pulse from signal AD, since signal M can only be equal to 1 when it coincides with the pulses of F2.

The opening of gate ET 59 also causes a change in condition of bistable scale 62, which temporarily stores an item of information signifying that the measurement has been effected. Logic level Q2A of scale 62 goes through level 1 and will be taken into account by the other scale 61 on the first H1 signal pulse from clock 45, thanks to gate ET 63, the output signal S1 of which then goes to level 1.

The following periodic F1 signal pulse being displaced in relation to the M and F2 signal pulses which coincide as has already been stressed above, then wipes out the information stored in scale 62.

The other scale 61 remains in the condition in to which it has been put, its output "Q" being at level 1 and its output "Q" being at level 0, and it plays a double role: on the one hand, level 1 obtained for signal Q1A lights signal line 64, in order to materialise the fact that the locating focus line is cut by a bottle 1 and to signal that the measurement has just been effected, which makes it possible to effect visual monitoring of operation and facilitate above all the preliminary settings of the device. In addition, additional level 0 transmitted by output "Q" of scale 62, and transmitted to one of the three inputs of gate ET 59, prevents a new measurement being effected. By referring to FIG. 10, it can be seen that this measurement "blocking" obtained as a result of the circuit formed by components 59, 62, 63 andd 61, occurs with a sufficient delay so as not to disturb the only measurement effected.

Monitoring has therefore been authorised for a very short period of time and, by virtue of the high frequency of the various signals, in relation to the speed of conveyer 5, the uncertainty concerning the position of the locating line only introduces a negligible error.

As long as the bottle 1 hides locating beam 28, after its passage into the precise monitoring position, comparator 60 will transmit a signal B the level of which remains equal to 0, this interval of time T being indicated on FIG. 11. Output "Q" of scale 61 is kept at level 0 during this interval and blocks gate ET 59, preventing any new measurement until bottle 1 is no longer cutting locating beam 28.

The need for this prevention of measurement is apparant if reference is made to the top of FIG. 11, which shows that the passage of a bottle 1 is always accompanied by two periods during which its lip 3 reflects detecting beam 40 in the direction of detector 33, so that it is necessary to avoid any new measurement until the bottle has passed and restric comparison to one comparison of voltage levels AD and VD at the precise moments *t*O at which the AR (locating) signal becomes less than reference level VR.

After the passage of any bottle beyond the locating beam 28, comparator 60 again transmits a signal B the level of which is equal to 1 (see the right-hand part of the FIG. 10, reference marked III), which causes the wiping out of the measurement prohibition. The circuits are then ready to monitor the next bottle, which is effected in a cycle identical to the one described above.

In the event of detection of a defective bottle, the defect signal V, transmitted to displacement recorder 65 goes through the latter at a speed adapted to that of 5, so that the ejection component is operated at the precise moment the bottle concerned passes. This recorder makes it possible to delay suitably an isolated rejection order or even several close orders, if it is found that several defective bottles follow each other, this delay being indicated by *t*1 in FIG. 11. Synchronising of recorder 65 is effected by means of a special clock 67, the frequency of which may be adjusted manually or by piloted by the forward movement of conveyer 5.

The "monostable" 66 makes it possible to control ejector 68, by regulating precisely its duration of operation *t*2.; it transmits an ejection signal E which appears at the end of time t1 defined by displacement recorder 65, as shown in the form of a diagram at the bottom of FIG. 11.

As is obvious, the invention is not limited only to this embodiment of the device for automatic monitoring of the verticallity of bottles as described above as an example; on the contrary it covers any variants using equivalent facilities.

I claim:

1. An apparatus for automatically monitoring the verticality of bottles, and more particularly cylindrical bottles with a small mouth, of the type where the bottles, previously sorted, are monitored by means of optical processes as they pass along a flat conveyor, comprising in combination:

an alignment device for the bottles effecting alignment thereof by the base of their body along a line parallel to the conveyor;

a first photoelectric locating device for transmitting a first signal when the base of the body of a bottle positioned by the aforementioned alignment device reaches a first optical beam perpendicular to the conveyor;

a second photoelectric detecting device for transmitting another optical beam oriented downwards and focused on a circular spot at the level of the top plane of a lip of the bottles and having a diameter less than the inside diameter of the said lip, the second device transmitting a second signal when a verticality defect of a bottle causes a reflection of said other optical beam on a flat annular part of its lip;

means responsive to this second signal only at the moment when the bottle reaches the first optical beam; and an ejector designed to eliminate the defective bottles and controlled by the aforementioned means.

2. The apparatus defined in claim 1 wherein said alignment device comprises a deflector made of a material with a low coefficient of friction, having an edge forming an angle with the center line of said conveyor, extended by a part parallel to the centerline of the conveyor defining an alignment line of the bottles, the said deflector being supported by a vertical column fixed to a side of the conveyor with the possibility of regulating its position along three mutually perpendicular lines.

3. The apparatus defined in claim 2 wherein the locating device has a projector and a photoelectric detector carried by an arch integral with a slide fitted with the possibility of regulating its vertical position on said column.

4. The apparatus defined in claim 2 wherein the detecting device has a projector and a photoelectric detector carried by a support plate connected to a slide fitted, with the possibility of regulating its vertical position, on said column, respective lines of the projector and the detector located on one and the same vertical plane perpendicular to the centerline of the conveyor being symmetrical in relation to a vertical line contained in this plane, mechanism being provided to adjust the position of the support plate along two horizontal perpendicular lines so that said vertical line is merged with the centerline of a bottle without verticality defect when this latter bottle reaches said first optical beam transmitted by said locating device.

5. The apparatus defined in claim 4 wherein the projector of the detecting device has a source of radiation connected to an optical section through an optical fiber.

6. The apparatus defined in claim 2 wherein the sources of radiation of the respective beams are infra-red sources, the radiation of which is modulated.

7. The apparatus defined in claim 1 wherein the means responsive to the signal from said detecting device only at the moment when the bottle reaches said first optical beam transmitted by said locating device comprises a first comparator designed to compare said second signal with a first voltage level displayed, a second comparator designed to compare the first signal transmitted by the locating device with a second voltage level displayed, a third comparator designed to compare the first signal with a third voltage level difference from the second level displayed, and logic circuits connecting the outputs of the aforementioned comparators to a control circuit for the ejector, these circuits being arranged so as to enable control of said ejector from the output signals, of the first two comparators, but to prevent any new action during an interval of time when the output signal of the third comparator preserves the value picked up at the moment when the bottle undergoing monitoring reaches the first optical beam transmitted by said locating device.

8. The apparatus defined in claim 7 wherein the aforementioned logic circuits have: a first AND gate (56) with two inputs, one of which is connected to the output of the first comparator (54), the output of which is connected to a control circuit (65, 66, 67) for the ejector (18); a second AND gate (59) with three inputs, one of which is connected to a synchronizing and modulating circuit (45, 46, 47, 52, 53), giving periodic pulses (H1, J2, J2, F1, F2), another input of which is connected to the output of the second comparator (57), the output of which is connected to the second input of the first AND gate (56); and a measurement authorization and blocking logic circuit, controlled from the output signal (B) of the third comparator (60), and from periodic pulses (H1, F1), received from the aforementioned synchronizing and modulating circuit (45, 46, 47, 52, 53), and giving a logic signal (Q1a) transmitted to the third input of the second AND gate (59).

9. The apparatus defined in claim 8 wherein the measurement authorization and blocking logic circuit comprises: a first bistable scale (62) controlled by the output signal (M) of the second gate ET (59) and by periodic pulses (F1) received from the synchronizing and modulating circuit (45, 46, 47, 52, 53); a third AND gate (63) one input of which receives periodic pulses (H1) from the said circuit and the other input of which receives the output signal (Q2A) corresponding to the condition of the first bistable scale (62); and a second bistable scale (61) controlled by the output signal (B) of the third comparator (60), and giving the logic signal (Q2A) corresponding to its condition, which is transmitted to the third input of the second AND gate (59).

10. The apparatus defined in claim 9 wherein a signal light (64) is connected to the last bistable scale (61) to indicate its condition.

11. The apparatus defined in claim 7 wherein said ejector (64) has a control circuit with a displacement recorder (65) designed to record and delay for a certain period of time (t1) an ejection order (V) coming from the logic circuits (56, 59, 61, 62, 63), and a circuit (66) designed to control the action of the ejector during a preset period of time (t2).

* * * * *